United States Patent [19]

Strasburg et al.

[11] 3,834,181
[45] Sept. 10, 1974

[54] AIRCRAFT ENGINE FLEXIBLE COUPLING

[75] Inventors: Richard N. Strasburg, Williamsport; Ezra F. Critchlow, Addison, both of Pa.

[73] Assignee: Avco Corporation, Williamsport, Pa.

[22] Filed: Oct. 26, 1973

[21] Appl. No.: 410,033

Related U.S. Application Data

[63] Continuation-in-part of Ser. No. 264,771, June 21, 1972, abandoned.

[52] U.S. Cl. .................. 64/1 V, 64/27 NM, 64/11, 64/14, 416/134
[51] Int. Cl. ............................................. F16d 3/00
[58] Field of Search .......... 64/27 NM, 30 D, 14, 13, 64/27 R, 1 V, 1 C; 416/134, 170

[56] References Cited
UNITED STATES PATENTS

| | | | |
|---|---|---|---|
| 1,740,362 | 12/1929 | Mader | 64/1 V |
| 1,965,742 | 7/1934 | Junkers | 64/1 C |
| 2,032,900 | 3/1936 | Alger | 416/134 |
| 2,041,507 | 5/1936 | Zeder | 416/134 |
| 2,554,311 | 5/1951 | Place | 416/134 |
| 2,880,599 | 4/1959 | Hlinsky | 64/11 R |
| 2,910,843 | 11/1959 | Happ et al. | 64/13 |

*Primary Examiner*—Benjamin W. Wyche
*Assistant Examiner*—Randall Heald
*Attorney, Agent, or Firm*—Charles M. Hogan; Gary M. Gron

[57] ABSTRACT

An aircraft engine of the reciprocating type has a flexible coupling interposed in the drive train between the engine crankshaft and a propeller. The flexible coupling includes an elastomeric material having a predetermined stiffness or spring rate. This stiffness is selected so that the resonant frequency of the major order for the combined propeller flexible-coupling crankshaft system is at an R.P.M. above idle but substantially below the engine's cruise R.P.M. The elastomeric compound has an internal damping factor of at least 0.2 to minimize the torsional oscillations during the resonant frequency condition.

11 Claims, 6 Drawing Figures

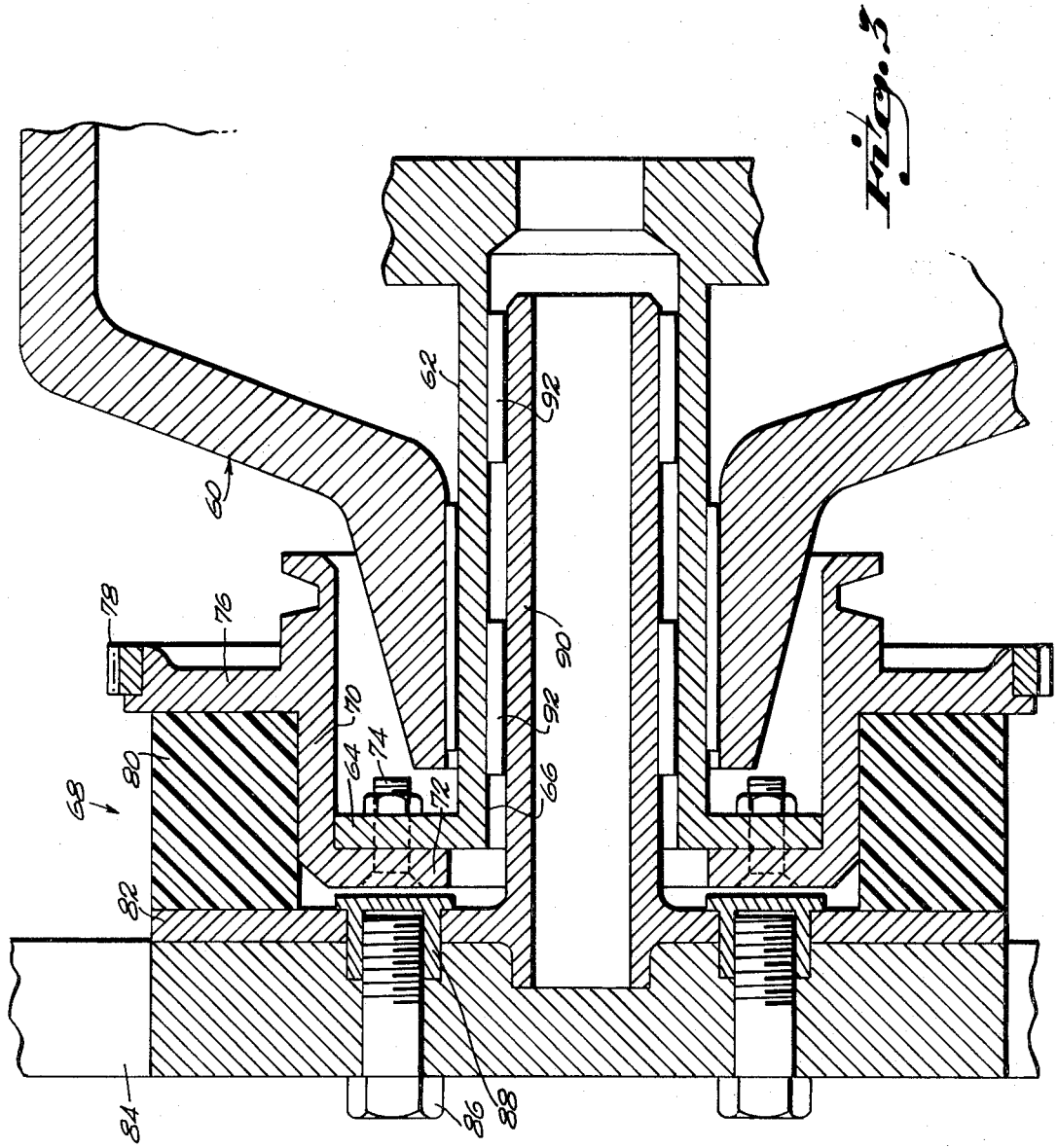
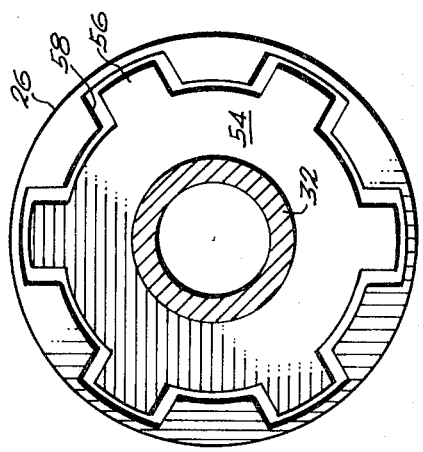

AIRCRAFT ENGINE FLEXIBLE COUPLING

This is a continuation-in-part of application Ser. No. 264,771, filed June 21, 1972, now abandoned.

The present invention relates to flexible couplings and more specifically to flexible couplings incorporated in aircraft engines.

For many years the problem of torsional vibrations in reciprocating aircraft engines has been a significant problem. The reason for this is that the aircraft engine, as opposed to an automotive-type engine, has no large flywheel or other large mass with which it is connected to limit torsional vibrations caused by the cyclical impulses produced by cylinder firings. The propeller has substantially a lower equivalent inertia than an automotive flywheel due to its own frequencies. With no substantial flywheel inertia present, a number of torsional vibration problems arise. These include possible gear failures in both the reduction gearbox and accessory gears in the geared engines and in the accessory gears of the direct drive engines. Problems may also be present with the accessories, such as alternator, compressor, hydraulic pump, etc. The propeller is also affected by the engine vibratory impulses. Some attempts have been made to solve this problem by incorporating tuned counterweights in the engine's crankshaft to damp the impulses produced by cylinder firings. This system of counterweights is effective in protecting engine parts, accessories and the propeller. However, they are relatively complicated, add weight and entail a good deal of production expense, particularly when they are incorporated in the smaller four-cylinder engines.

In the past, also, flexible couplings have been introduced between the engine crankshaft and a propeller for an aircraft engine. These couplings have a rather limited effectiveness since they result in a system of two rotating masses interconnected by a spring. Many times the resonant frequency for the major order of the system occurs within the normal operating R.P.M. range of the engine. This causes the amplitude of the torsional vibrations of the system to increase to such a degree that it destroys the coupling or other engine components.

Accordingly, it is an object of the present invention to simply and effectively minimize the effects of vibration on the aircraft engine components and at the same time minimize the torsional oscillations produced at the propeller.

These ends are achieved in an internal combustion engine having an output shaft rotatable at varying rates between the limits of an R.P.M. operating range and a propeller adapted to be driven by the output shaft. A flexible coupling having a predetermined spring rate connects the output shaft and the propeller. This forms a rotating system comprised of two masses interconnected by a spring and having a resonant frequency of the major order at a given R.P.M. that is encountered only during a transient operating condition between the limits of the R.P.M. range. The coupling has an internal damping factor of at least 0.2 to limit the torsional oscillations of the coupling at the resonant frequency condition.

The above and other related objects and features of the present invention will be apparent from a reading of the following description of the accompanying drawings and the novelty thereof pointed out in the appended claims.

In the drawings:

FIG. 2 is a sectional view of the coupling illustrated in FIG. 1, taken on line 2—2 of FIG. 1;

FIG. 3 is a fragmentary sectional view of another flexible coupling embodying the present invention;

Figure 1:
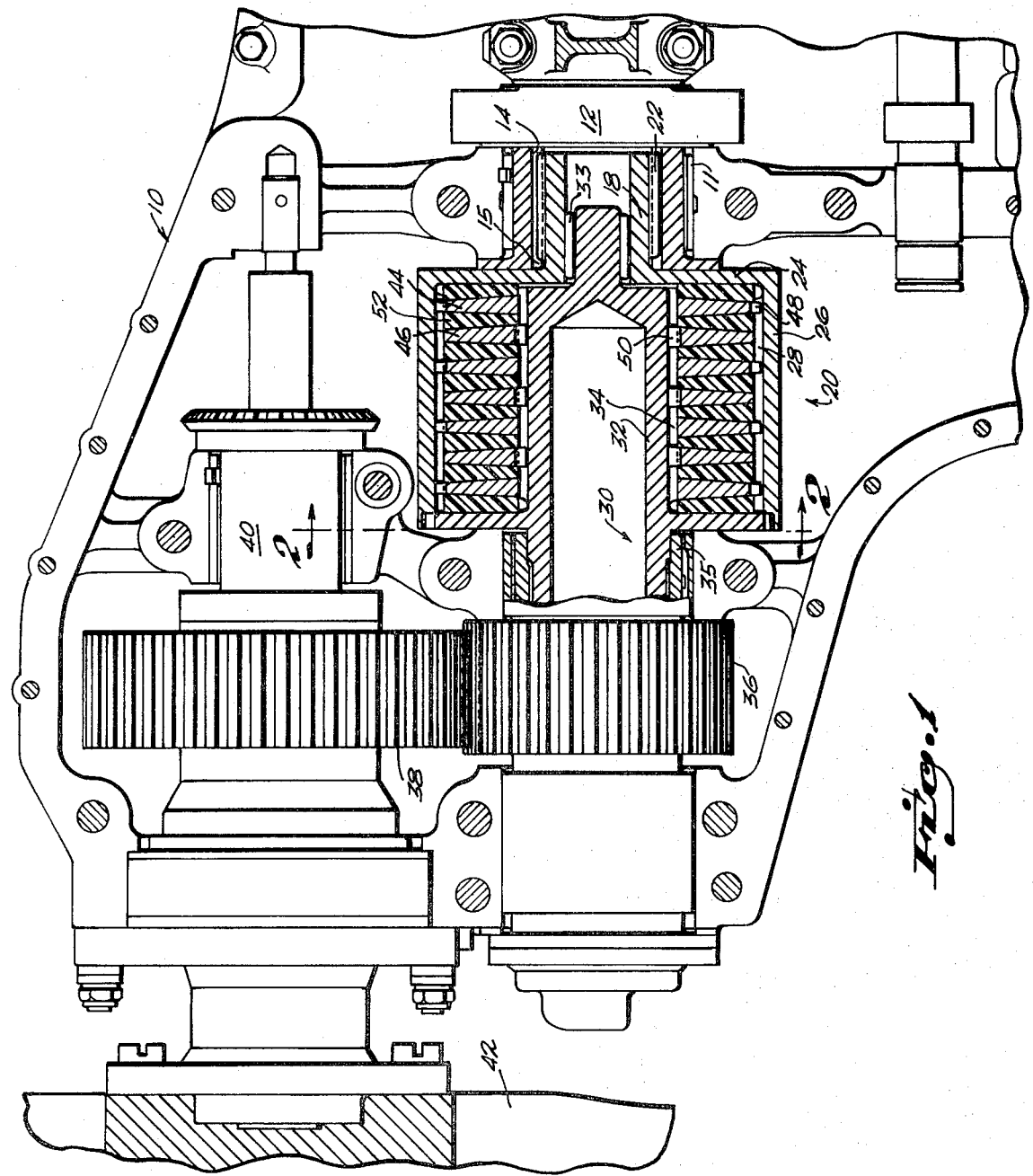
FIG. 1 shows a fragmentary cross-sectional view of a geared drive internal combustion aircraft engine incorporating a flexible coupling which embodies the present invention.

Referring now to FIG. 1, the internal combustion engine comprises a crankcase 10 in which a crankshaft 12 is journaled by a bearing 11. The details of an internal combustion engine of this type are well known and will not be repeated, to simplify the discussion of the present invention. To fully explain the operation of the engine, the crankshaft has a series of connecting rods journaled on crankshaft throws. These connecting rods extend to pistons which reciprocate within cylinders. Through a suitable valve arrangement a combustible mixture passes into the cylinders and it is ignited to produce a pressure force which drives the piston to rotate the crankshaft.

The crankshaft has an output bore 14 with internal splines 15. An input shaft 18 for a flexible coupling, generally indicated by reference character 20, has an external spline 22 which interfits with internal spline 14. Input shaft 18 has as intergral flange 24 extending to an integral sleeve 26 having internal splines 28. An output element, generally indicated by reference character 30, has an internal shaft 32 with external splines 34 that is telescoped into sleeve 26 to form an annular space in between. The end of shaft 32 is journaled by a bearing 33 in input shaft 18. Shaft 35, telescoped over shaft 32, has an integral reduction gear 36 which meshes with a propeller drive gear 38 on a propeller output shaft 40 suitably journaled within crankcase 10. A propeller 42 is suitably mounted on propeller output shaft 40.

The flexible coupling 20 has a series of stacked alternating input and output discs 44 and 46, respectively, positioned between shaft 32 and sleeve 26. Discs 44 have tabs 48 received in internal splines 28 of sleeve 26. Dises 46 have tabs 50 which are received in external splines 34 of shaft 32. Tabs 50 have a greater thickness than tabs 48 because they must carry a greater shear force for a given amount of torgue transferred than the tabs 48 which are positioned at a greater radius from the center of rotation of the coupling. A suitable elastomeric material in the form of discs 52 is positioned in between and bonded to adjacent discs 44 and 46. Thus the torque is transmitted from the input discs 44 through the elastomeric discs 52 to the output discs 46 in parallel and in shear.

Referring to FIG. 2, output shaft 32 has an integral flange 54 with a series of tabs 56 extending from its periphery. These tabs are received in notches 58 formed in a portion of the circumference of the sleeve 26. Thus the torsional oscillation of the input and output components of the coupling are limited relative to each other to provide a positive coupling in the event of separation of the elastomeric discs 52.

The elastomeric discs 52 are selected so that they have a predetermined stiffness or spring rate. This spring rate is carefully chosen so that the resonant frequency of the rotating system comprised of the propeller, flexible coupling and crankshaft is at a point that is encountered for only a short period of the operation of the engine, particularly during a transient condition.

For the coupling that is installed inside the engine the elastomer must be able to withstand high temperatures. For the case in question, maximum expected is 275°F. In addition, the horse power of the engine with which the coupling is used determines the size requirements and the amount of elastomer needed to transmit the torque (or Power) at non-resonant speeds, which would be full power at top speed.

Figure 4:
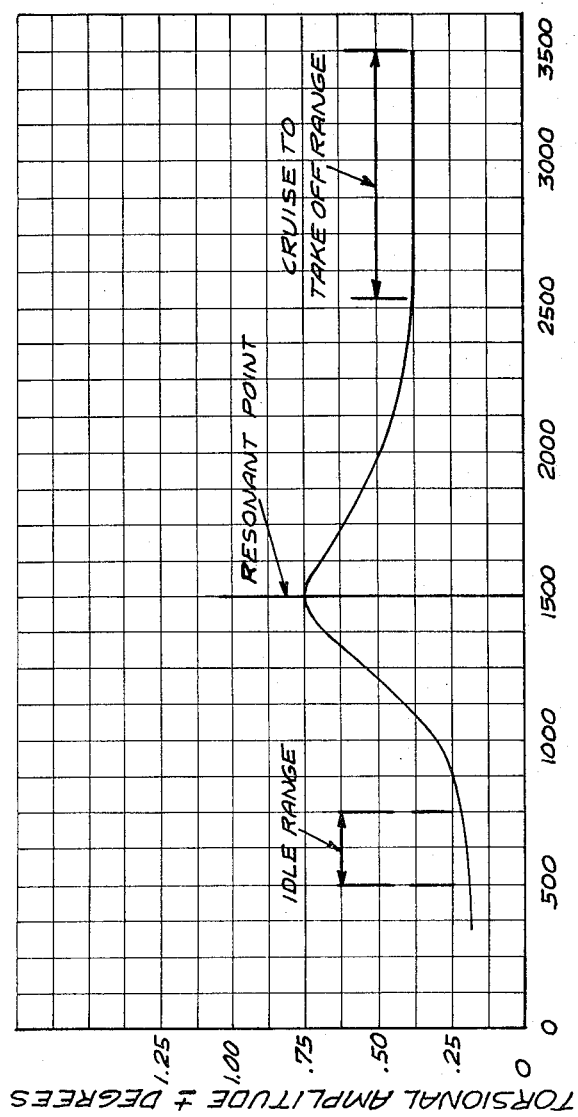
FIG. 4 is a graph showing torsional oscillations versus engine R.P.M. for the couplings embodying the present invention.

Reference is directed to FIG. 4 for a discussion of a particular engine with which the present invention may be used. This is by way of explanation only and should not be construed as limiting the application of this flexible coupling to other engines having different operating characteristics which require flexible couplings with different specifications. By way of explanation, reference is directed to FIG. 4 which shows torsional amplitude versus R.P.M. for the engine. It can be seen that the normal operating range of the engine extends from idle through cruise to the R.P.M. at which maximum horsepower is produced. The resonant frequency for the major order is selected to lie at an R.P.M. which is above idle but substantially below cruise so that it is encountered only during a transient condition of the engine. In particular, for a six-cylinder engine the major or third order resonant frequency could be selected to occur at 1,500 R.P.M. This may be achieved in the present coupling by using an elastomeric material having a rotational spring rate of 165,000 in.-lb./rad., where the engine inertia is 0.80 lb.-in.-sec.$^2$ and the propeller equivalent inertia is 11.0 lb.-in.-sec.$^2$. A particular rubber that may be incorporated for this purpose is Lord BTR elastomer, manufactured by The Lord Manufacturing Company, Erie, Pennsylvania.

The flexible coupling which is designed to place the critical third order torsional resonance of the crankshaft propeller combination at some predetermined intermediate speed produces a vibrating system with by a single degree of freedom. The maximum torsional amplitude at this critical speed is determined by the overall damping in the system. Since little or no damping is realized in the steel members of the drive system, damping must be introduced by the coupling which in this case is the elastomer.

Figure 5:
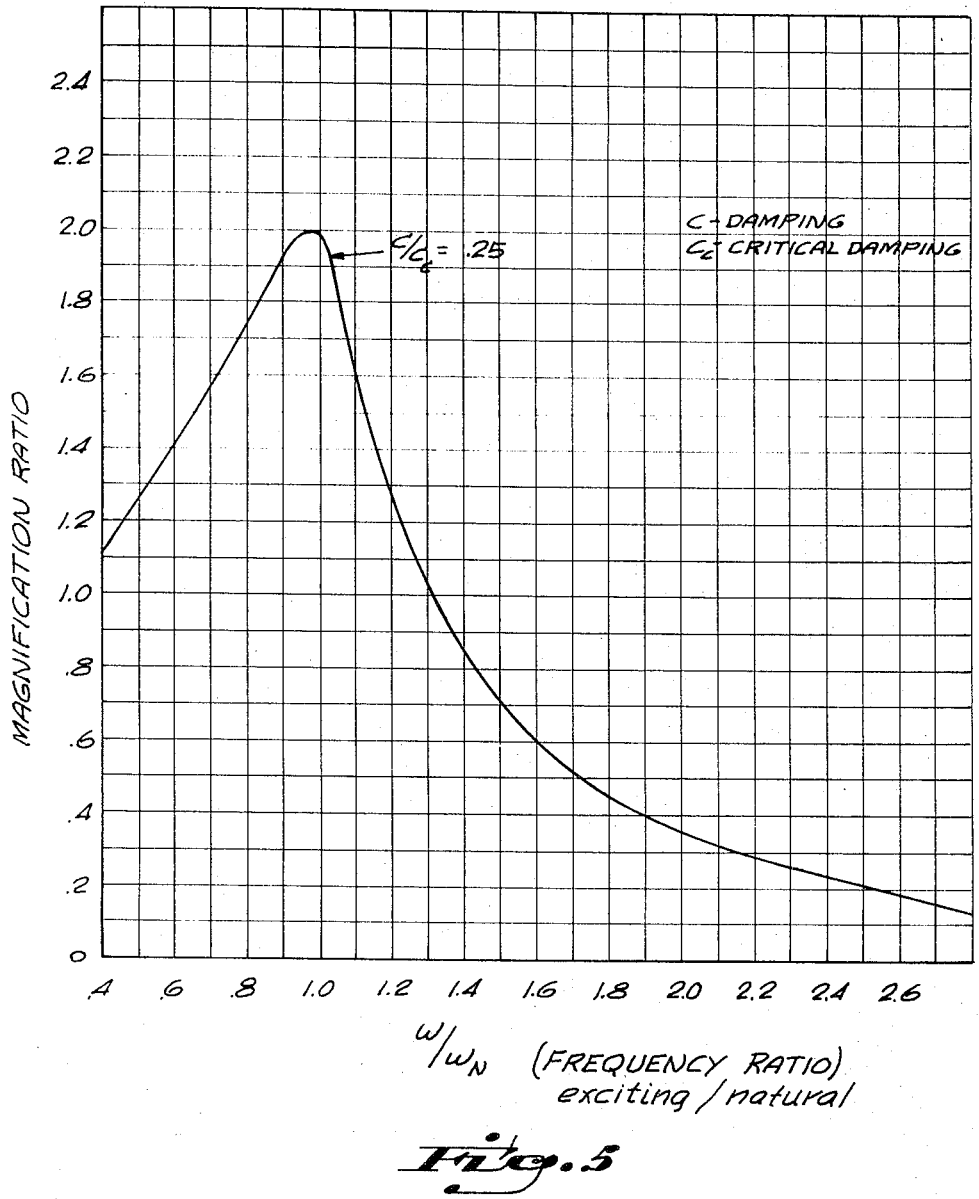
FIG. 5 is a graph showing resonant vibration amplitude versus the frequency ratio between the exciting and natural frequencies of the coupling for a first internal damping factor.

As shown in FIG. 5, the flexible coupling used to produce the operating characteristics of FIG. 4 is acceptable with an internal damping factor of $C/C_c$ of preferably over 0.25 where the frequency ratio of 1 occurs between idle and the lowest usable cruise speed (1,500 R.P.M.). From FIG. 5 this would result in a magnification ratio of 2.0. If the coupling has a maximum torsional amplitude of 0.50 degrees at nonresonant speeds, which is determined from the engine torque and the amount of elastomer used, then the amplitude at resonance (1,500 R.P.M.) would be $2.0 \times 0.5 = 1.0°$.

Figure 6:
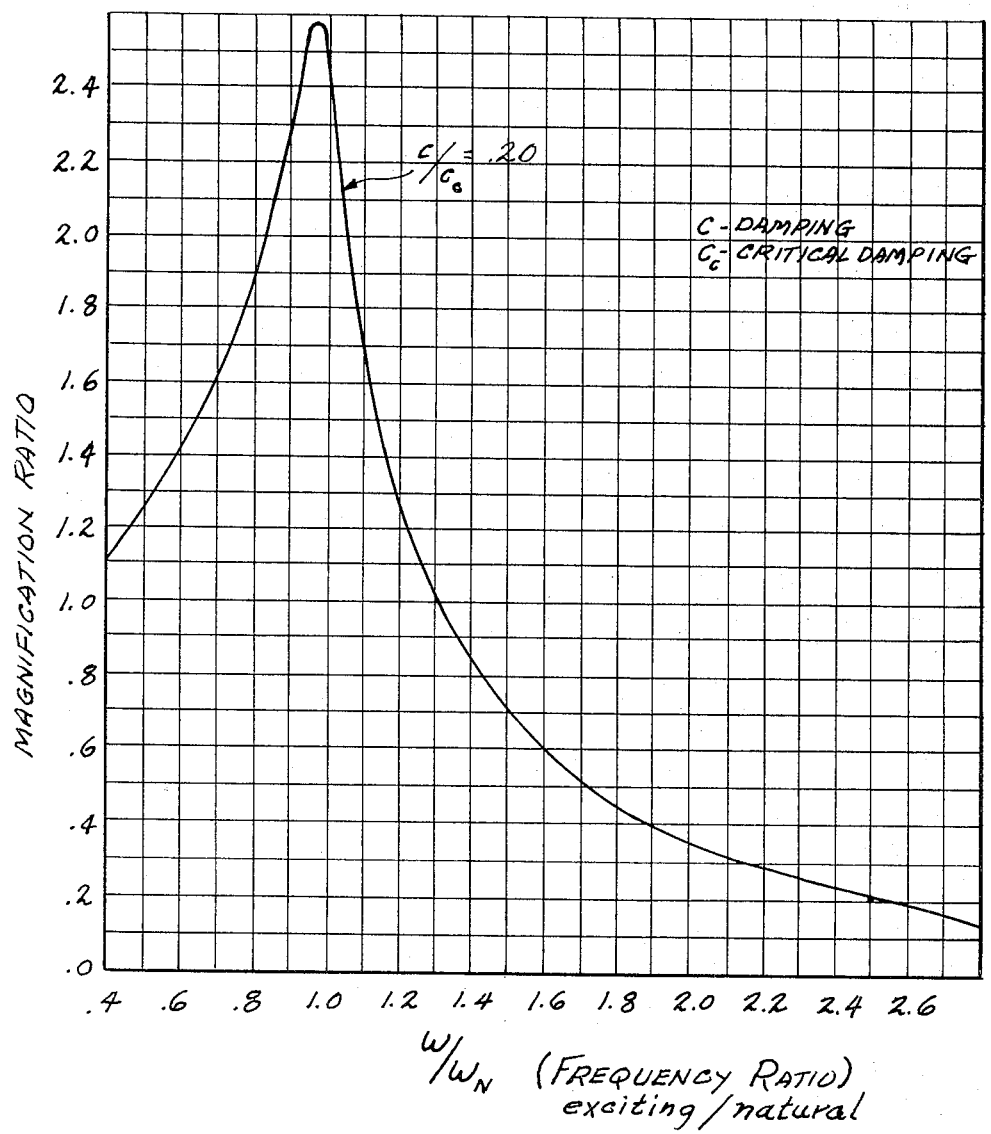
FIG. 6 is a graph showing resonant vibration amplitude versus the frequency ratio between the exciting and natural frequencies of the coupling for a second, lower internal damping factor.

The torque in this design is transmitted across the elastomeric material in shear so that its stiffness and resultant spring rate is affected very little by the amount of deflection introduced by the normal torque output of the engine. As seen in FIG. 6, the internal damping factor $C/C_c$ may be as low as 0.20 and still give reasonably acceptable damping.

The above coupling is incorporated in a geared drive engine, namely, one in which the crankshaft drives the propeller through a reduction gear box. While the gear train in the gear box modifies the criteria for the resonant frequency of the rotating system described above, the primary elements are the mass of the propeller and the mass of the crankshaft and the spring rate introduced by the flexible coupling.

For engines incorporating a direct drive the embodiment of FIG. 3 may be incorporated. In this arrangement there is an engine crankcase 60 having a crankshaft 62 extending therefrom. Crankshaft 62 has an integral mounting flange 64 surrounding an internal bore 66.

The flexible coupling, generally indicated by reference character 68, comprises an input element 70 having an inwardly directed flange 72 secured to mounting flange on the shaft 62 by means of screws 74 and an outwardly facing flange 76 incorporating a starter ring gear and alternator pulley 78 around its periphery. An annular elastomeric disc 80 is bonded to flange 76 and also to a propeller mounting flange 82. A propeller 84 is suitably mounted on propeller mounting flange 82 by a series of bolts 86 which are threaded into prop bushings 88 secured in mounting flange 82. Flange 82 has an integral inner shaft 90 which telescopes into bore 66 and is journaled therein by suitable sleeve bearings 92. A suitable failsafe item must be incorporated with this system.

The stiffness of the elastomeric material in this arrangement is selected so that the resonant frequency of the propeller, flexible coupling, crankshaft rotating system is at a point above idle and substantially below cruise in a fashion similar to that for the coupling of FIGS. 1 and 2. As the system passes through the R.P.M. at which the resonant frequency occurs, flange 82 will rotate relative to input element 70 but the integral damping of the elastomeric material 80 will limit the torsional oscillations.

To summarize the invention discussed above, the flexible coupling has two main functions: (1) To produce the flexibility required to place the critical resonant frequency at a predetermined intermediate speed. If the speed and order picked is third order at 1,500 R.P.M., the system must withstand the vibrations when going through this resonant condition. (2) The coupling must also produce enough damping to control the amplitude to an acceptable limit at this transient condition.

The above couplings do a highly effective job of minimizing the effects of crankshaft vibrations on the engine components and on a propeller. The proper selection of the resonant frequency during transient operating conditions insures that the time to which the system is exposed to this condition is extremely limited. Furthermore, the high degree of internal damping of the elastomeric material limits the torsional oscillation during this resonant frequency condition to an extremely acceptable level.

While the preferred embodiment of the present invention has been described, it should be apparent to those skilled in the art that it may be modified other than expressly shown without departing from the spirit and scope thereof. For example, the elastomeric material may be flexed in a manner other than shear, such as compression, with equal results.

Having thus described the present invention, what is claimed as novel and desired to be secured by Letters Patent of the United States is:

1. In combination:
    a reciprocating internal combustion engine having a crankshaft rotatable at varying rates extending from an idle condition through a normal operating range to an upper limit of a maximum power condition;
    a propeller adapted to be driven by said crankshaft to produce a prime propulsive thrust; and
    means connecting said crankshaft and said propeller and including an elastomeric coupling transmitting substantially all of the torque between said crankshaft and propeller to form a rotating system comprised of two masses interconnected by a spring, said elastomeric coupling having a predetermined stiffness producing a resonant frequency for the system at a given transient R.P.M. that is above the idle R.P.M. and substantially below the normal operating R.P.M. for said engine, said elastomeric coupling further having an internal damping factor $C/C_c$ of at least 0.20 to limit the torsional oscillations of said coupling at the resonant frequency condition.

2. Apparatus as in claim 1 wherein said elastomeric material transmits the torque from said crankshaft to said propeller in shear.

3. Apparatus as in claim 1 wherein said R.P.M. at which the resonant freqency occurs is between 1,400 and 1,800 R.P.M.

4. Apparatus as in claim 1 wherein the internal damping factor $C/C_c$ is at least 0.25.

5. Apparatus as in claim 4 wherein the rotational spring rate of said elastomeric coupling is approximately 165,000 in.lb./rad.

6. Apparatus as in claim 1 wherein:
    said reciprocating internal combustion engine has an output reduction gear between said crankshaft and said propeller;
    said elastomeric coupling is interposed between said reduction gear and said crankshaft to transmit the torque therebetween.

7. Apparatus as in claim 6 wherein said elastomeric element transmits torque between said crankshaft and said reduction gear in shear.

8. Apparatus as in claim 7 wherein said connecting means comprises:
    an annular input member coaxial with and extending forward from said crankshaft, said input member having internal longitudinal splines;
    an output element telescoped into said input member forming an annular space therebetween, said output member having external splines around its periphery;
    a series of stacked input and output discs alternately having tabs received in the inward splines and in the external splines, and a series of elastomeric discs bonded to adjacent input and output discs whereby the torque is transmitted through said elastomeric discs between said input and output members in parallel.

9. Apparatus as in claim 8 wherein said input member has a notch in its open end extending for a portion of its circumference and said output member further comprises a radial tab aligned within said notch so that the rotation of the output member relative to the input member is limited.

10. Apparatus as in claim 1 wherein said engine crankshaft is adapted to directly drive said propeller and said connecting means comprises:
    an annular input disc secured to the end of said crankshaft;
    an output element comprising a shaft journaled in the end of said crankshaft and having an outer facing flange on which the propeller is secured, said flange being spaced from said disc;
    an elastomeric disc bonded to said input disc and said flange for transmitting the torque therebetween in shear.

11. Apparatus as in claim 10 wherein said elastomeric coupling has an internal damping factor $C/C_c$ of at least 0.25.

* * * * *